United States Patent
Nägele et al.

(10) Patent No.: US 8,573,362 B2
(45) Date of Patent: Nov. 5, 2013

(54) DEVICE AND METHOD FOR THE LUBRICATION OF A CHAIN DRIVE

(75) Inventors: Michael Nägele, Walddorfhäslach (DE); Werner Koch, Stuttgart (DE); Mohammad Karimi Tabatabai, Giessen (DE); Guntram Fleischhauer, Lohra-Kirchvers (DE); Jan Tabellion, Staufenberg (DE)

(73) Assignee: Schunk Kohlenstofftechnik GmbH, Heuchelheim (DE)

( * ) Notice: Subject to any disclaimer, the term of this patent is extended or adjusted under 35 U.S.C. 154(b) by 153 days.

(21) Appl. No.: 12/757,470

(22) Filed: Apr. 9, 2010

(65) Prior Publication Data

US 2011/0250999 A1    Oct. 13, 2011

(51) Int. Cl.
- *F16N 7/16* (2006.01)
- *F16N 15/00* (2006.01)
- *B61K 3/00* (2006.01)
- *F16H 57/04* (2010.01)

(52) U.S. Cl.
USPC .............. 184/15.1; 184/3.2; 184/99; 474/91

(58) Field of Classification Search
USPC ............ 184/11.5, 3.1, 3.2, 99, 100, 15.1, 16; 474/91
See application file for complete search history.

(56) References Cited

U.S. PATENT DOCUMENTS

| | | | |
|---|---|---|---|
| 603,654 A | 5/1898 | Norris | |
| 1,998,682 A * | 4/1935 | McCann | 184/15.1 |
| 2,355,003 A * | 8/1944 | McCann | 184/16 |
| 2,813,599 A * | 11/1957 | Amberg | 184/16 |
| 2,909,937 A * | 10/1959 | Williams | 474/91 |
| 3,454,495 A * | 7/1969 | Schneider | 508/172 |
| 3,515,013 A | 6/1970 | Wykes | |
| 4,194,413 A | 3/1980 | Hentze | |
| 4,593,923 A * | 6/1986 | Thalmann | 280/261 |
| 4,891,037 A | 1/1990 | Maples | |
| 5,213,180 A * | 5/1993 | Masonek et al. | 184/15.2 |
| 5,346,429 A * | 9/1994 | Farley | 460/16 |
| 5,484,038 A * | 1/1996 | Rowell | 184/15.1 |
| 5,858,931 A * | 1/1999 | Tanaka et al. | 508/364 |
| 6,070,697 A * | 6/2000 | Millard | 184/15.1 |
| 6,942,409 B2 * | 9/2005 | Barbieri | 401/10 |
| 7,108,104 B2 * | 9/2006 | Mitrovich et al. | 184/3.2 |

FOREIGN PATENT DOCUMENTS

| | | |
|---|---|---|
| DE | 36 39 389 A1 | 5/1988 |
| JP | 5611192 S | 7/1979 |
| JP | 59145476 U | 9/1984 |
| JP | 63115890 A | 7/1988 |

(Continued)

OTHER PUBLICATIONS

JP08207870A English Translation.*

(Continued)

*Primary Examiner* — William E Dondero
*Assistant Examiner* — Minh Truong
(74) *Attorney, Agent, or Firm* — Quarles & Brady LLP

(57) ABSTRACT

An application device and a method of use for the lubrication of a chain drive, more preferably for motorcycle chain drives or the like, includes a rail device. The rail device having a longitudinal side that can be brought to bear against a chain of the chain drive. The rail device includes a contact region formed of a consumable solid lubricant that can be applied to the chain and that can be brought in contact with the chain.

27 Claims, 4 Drawing Sheets

(56) References Cited

FOREIGN PATENT DOCUMENTS

| | | | |
|---|---|---|---|
| JP | 07267170 | A | 10/1995 |
| JP | 08142971 | A | 6/1996 |
| JP | 08207870 | | 8/1996 |
| JP | 08207870 | A * | 8/1996 |
| JP | 2001032896 | A | 2/2001 |
| JP | 2005112871 | A | 4/2005 |
| JP | 2006037997 | A | 2/2006 |
| JP | 2007051738 | A | 3/2007 |

OTHER PUBLICATIONS

European Search Report dated Jun. 4, 2009.

\* cited by examiner

DEVICE AND METHOD FOR THE LUBRICATION OF A CHAIN DRIVE

CROSS-REFERENCE TO RELATED APPLICATIONS

Not Applicable.

STATEMENT CONCERNING FEDERALLY SPONSORED RESEARCH OR DEVELOPMENT

Not applicable.

BACKGROUND

The invention relates to an application device and a method for the lubrication of a chain drive, more preferably for motorcycle drives or the like, wherein the application device comprises a rail device, wherein the rail device with its longitudinal side can be brought to bear against a chain of the chain drive and comprises a contact region contactable with the chain, wherein at least the contact region is formed of a consumable solid lubricant that can be applied to the chain.

As is known, chain drives require regular lubrication with a lubricant, wherein a viscous lubricant or a solid lubricant can be used. Viscous lubricants particularly have the disadvantage that contaminations such as for example dust, sand etc. can easily adhere to the chain drive because of a lubricating film formed by the lubricant. These contaminations have an abrasive effect on sliding surface pairings of the chain drive and thus promote early wear of the latter. Particularly chain drives exposed to rough ambient conditions such as for example motorcycle chain drives, bicycle chain drives or the like are therefore subject to comparatively short service or maintenance intervals.

Furthermore, application devices comprising solid lubricants are known from the prior art which can be brought to bear against parts of a chain drive. Accordingly, application of a solid lubricant to the chain drive occurs without formation of a lubricating film, as a result of which absorption of dirt from an environment can be prevented. To this end, the solid lubricant is applied to parts of the chain drive by means of a brush. Disadvantageous here is that a regularly high relative speed of a chain or of sprocket wheels in mesh with the chain prevents reliable application of the lubricant. Even an application device acting under preload on a part of a chain drive negatively influences running characteristics of the chain drive through vibrations or through friction caused or induced thus. In addition to this, a lubricant depot is used up comparatively rapidly through contact pressure on the chain drive generated in this connection. In addition, the known application devices are designed so that due to their shape they could hardly be positioned within a chain drive in a suitable manner. Particularly in the case of motorcycle chain drives there is little space available for positioning an application device since the chain drive is regularly guided about an axle of a swingarm of a rear wheel in such a manner that the swingarm is located within the closed chain of the chain drive. Apart from this, the swingarm allows movement of an output sprocket wheel about the axle of the swingarm, as a result of which a position of the chain can be continually varied relative to a locationally fixed frame or to a drive sprocket wheel. Thus it is hardly possible to mount an application device in a locationally fixed manner without chain operation, which is subjected to continuous load changes anyway, being negatively influenced by the application device.

SUMMARY OF THE INVENTION

It is therefore the object of the invention to propose an application device and a method for the lubrication of a chain drive which does not substantially influence running characteristics of a chain drive yet makes possible simple and reliable lubrication of the chain drive.

This object is solved through an application device and method of use for lubrication of a chain drive, more preferably for motorcycle chain drives, such as described herein. The application device for the lubrication of a chain drive according to the invention, more preferably for motorcycle chain drives or the like, comprises a rail device, wherein the rail device with its longitudinal side can be brought to bear against a chain of the chain drive and comprises a contact region contactable with the chain, wherein at least the contact region is formed of a consumable solid lubricant that can be applied to the chain.

Since the rail device in particular has a comparatively long contact region compared with an application device placed only in concentrated engagement with a chain, operation of the chain is not substantially influenced even at high relative speeds. This is more preferably brought about in that the rail device can contact a plurality of chain links simultaneously, which favours quieter operation of the chain. Insofar such a rail device is advantageous even in the case of load changes since the chain is then stabilised by means of the rail device. High relative speeds of the chain are also made possible since a possible contact region available is comparatively large which ensures reliable and low-friction lubrication of the chain.

If the rail device comprises at least one guide element, secure guiding of the chain and thus low-vibration straight-line running behaviour of said chain can be guaranteed by means of the application device.

In an embodiment the guide element can be designed plate-shaped. Through its plate-shaped configuration the guide element can be formed particularly easily. The plate-shaped guide element on its own can for instance form the rail device.

It is particularly advantageous if the guide element is designed so that it forms the contact region and can be contacted with bushes of a chain. Thus, direct application of the solid lubricant to the wear parts or the components of the chain drive place in contact engagement can be guaranteed. Furthermore, the guide element can be dimensioned in its width so that inner link plates of the chain can be contacted with the guide element so that lubrication of the inner link plates as well as reliable lateral guidance of the chain can be guaranteed.

Furthermore, the guide element can form an incline in longitudinal direction. The chain can then be guided to the rail device at an acute angle in running direction so that a contact pairing between chain and rail device can be established in a hardly perceptible manner or without substantial influence on the running characteristics of the chain.

In a further embodiment the rail device can comprise outer guide elements which are designed so that between them they can accommodate outer link plates of a chain. Through the outer guide elements guiding of the chain in the rail device can be still further improved. In addition, jumping of the chain from the rail device or lateral movements or swinging of the chain in a lateral direction brought about for example through load changes can be avoided.

In addition, the rail device can then comprise a connecting section for connecting the guide elements. A connecting section or sections can for example form a bottom of the rail device which upon consumption of the solid lubricant comes to bear against the link plates of the chain, limiting a further movement of the chain across the running direction.

It can also be advantageous if the rail device is formed of multiple parts. The rail device can then be formed of different components each of which in turn can consist of different materials. For example the components of the rail device which do not primarily serve for the lubrication of the chain can be formed of a plastic material with special sliding characteristics. In this way it is also possible to replace worn components or a used-up solid lubricant piece independently of the remaining components of the rail device.

Such a rail device can more preferably be simply produced if the rail device is formed as a stack arrangement of guide elements with connecting sections. The guide elements and the connecting sections can then be each embodied as flat component which, joined into a stack, form the rail device.

Particularly secure guiding of the chain is made possible if the rail device comprises at least one additional guide element which forms a covering element in such a manner that a chain can be enclosed by the rail device on all sides transversely to a movement direction. Accordingly, the covering element can thus cover an otherwise open side of the rail device in such a manner that the chain can be entirely surrounded at least partially by the rail device transversely to the running direction. Possible movements of the chain transversely to the running direction can thus be completely limited.

In a further embodiment the rail direction can be formed monolithically. The rail device can then be produced particularly simply and cost-effectively, for example as a type of a profile.

To further influence running characteristics of the chain the contact region in longitudinal direction can comprise at least two contact sub-regions of different geometry. In addition, such a formation of a contact region can take into account running-in of a chain with the application device or wear behaviour of the contact region.

Thus the rail device can at least partially form a contact region that is flat in longitudinal direction. A flat contact region more preferably makes possible straight guiding of a chain.

In addition, the rail device can at least partially form a contact region that is convex in longitudinal direction. The chain can then be guided to or guided away from the contact region at an acute angle. Thus it can also be ensured that the chain is at least tangent to the contact region.

In order to be able to position the rail device within a chain drive in a suitable manner it can be advantageous if the rail device forms at least one truncated wedge form. Since chain drives often comprise sprocket wheels with different pitch circle diameters the rail device can then offset an angle thus formed between a fastening plane of sprocket wheel axes and the chain.

It can also be advantageous if the rail device can be brought to bear against a load side of a chain. A load side compared with a slack side is regularly tensioned straight with the running direction of the chain remaining the same and except for load changes, so that the contact region of the rail device is less exposed to irregular transverse movements or transverse forces of the chain and therefore wears less rapidly.

In contrast with this, the rail device can be brought to bear against a slack side of a chain. A slack side regularly reacts to shocks of the chain drive, for example during off-road operation of a vehicle, and load change through swinging or knocking of the chain. The rail device can thus limit or diminish swinging or knocking of the chain if the rail device is arranged on the slack side.

In order to ensure accurate positioning of the application device with respect to the chain the application device can comprise a holding device for positioning and holding the rail device relative to a chain. In addition, the holding device in the case of a multiple part rail device can be formed so that the holding device fixes the components of the rail device relatively to one another.

Furthermore, the holding device can be formed in such a manner that it can be connected with a swingarm of a motorcycle. Thus the holding device can position the rail device for example relatively closely to an axis of rotation of the swingarm so that guiding of the rail device approximately parallel in running direction relative to a chain upon movement of the swingarm together with the chain is guaranteed. In addition, the holding device can offset any different orientations of the chain relative to the configuration of the swingarm.

In this context it is advantageous if the rail device can be varied in its height relative to the holding device by means of an adjusting device. The rail device can be optionally positioned relative to the chain for example by means of a spring, screw or a wedge. Wear of the rail device can then be offset through changed positioning of the rail device. It is likewise possible to change an effective contact region or a contact force in a desired manner.

Advantageously the holding device can be formed so that at least the consumable solid lubricant can be replaced. A worn-out solid lubricant piece can then be replaced in a particularly simple manner. Preferentially the holding device of the solid lubricant piece can be held so that replacing is made possible without the assistance of tools.

More preferably chain-driven motorcycles regularly comprise a swingarm guard which is arranged on a side of the swingarm facing a chain near a drive sprocket wheel. The swingarm guard is to prevent direct contact of chain and swingarm during load changes or swingarm movements and thus protect the chain and the swingarm from damages. Insofar it is advantageous if the application device is formed so that it can be utilised as a swingarm guard for a motorcycle, as a result of which use of a separate swingarm guard can be omitted.

The application device can also be formed so that it can be utilised as a chain guide for a motorcycle. Especially an arrangement of the chain guide near the output sprocket wheel has proved to be advantageous. Thus, undesirable knocking of the chain especially near the output sprocket wheel in the region of the slack side can be prevented. Here the chain guide primarily serves for guiding the chain, while lubrication of the chain can be carried out by means of the chain guide. A conventional chain guide can consequently be additionally equipped with a rail device which guarantees a guiding function.

It proves to be particularly advantageous with respect to the lubricating characteristics and the abrasion behaviour as a prerequisite for transferring the lubricant onto the chain if the solid lubricant is produced on a graphite basis.

The advantageous lubricating and abrasion characteristics of graphite can be achieved even if the solid lubricant at least partially consists of graphite and of additional admixtures for the remainder, which make possible setting of additional desired characteristics of the solid lubricant. Thus, even independently of the exclusive or proportional use of a graphite material for forming the solid lubricant, other suitable additional substances, such as for example molybdenum sulfide, tungsten disulfide, polytetrafluoroethylene, tricalcium phosphate, calcium hydroxide, polyethylene, polyamide can be used. In addition to this, the use of soft metals such as for example lead, copper, antimony is also conceivable. With respect to the formation of the solid lubricant on a graphite basis, admixtures of Teflon, copper, lead, antimony and molybdenum disulfide prove to be particularly advantageous.

Independent of the choice of a suitable additive material it is advantageous if the solid lubricant contains a wear-diminishing additive such as for example polytetrafluoroethylene. Thus, possibly undesirable excessive wear of the solid lubricant can be limited.

It likewise proves advantageous if the solid lubricant contains a corrosion-inhibiting additive with which the corrosion resistance of the chain drive especially in the region of engagement surfaces can be improved.

In order to make possible a use of different material compositions of the solid lubricant that is sequential or consecutive in time it proves advantageous if the solid lubricant has a layer structure with layers that differ in their composition. In this context applications are also conceivable in which the addition of an agent to the solid lubricant proves advantageous, which agent, at a regular utilisation interval of the chain drive, can remove a possibly formed corrosion layer.

With the method for lubricating a chain drive according to the invention, more preferably for motorcycle chain drives or the like, with an application device comprising a rail device, the rail device is brought to bear against a chain of the chain drive with a contact region of its longitudinal side, wherein at least the contact region is formed of a consumable solid lubricant that is applied to the chain.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION

Figure 1:
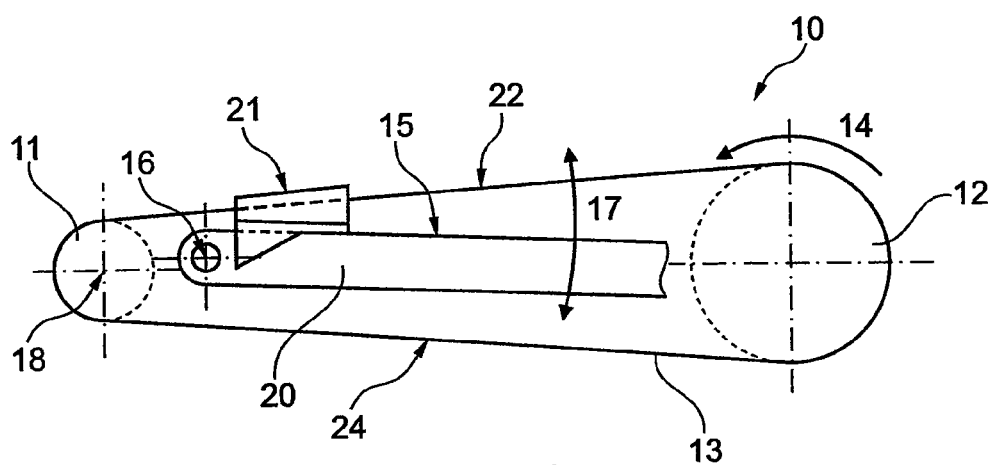
FIG. 1 shows a schematic representation of a chain drive of a motorcycle in a front view.

FIG. 1 shows in a schematic representation a chain drive 10 of a motorcycle which is not represented any further, which is formed of a drive sprocket wheel 11, an output sprocket wheel 12 and a chain 13. A running direction intended for the chain 13 is marked by an arrow 14. The drive sprocket wheel 11 is arranged in a locationally fixed manner on a drive of a motorcycle which is not shown in more detail here, wherein the drive sprocket wheel 12 is mounted to a swingarm 15 allusively shown here, which can swivel about a swingarm axle 16. The swingarm 15 with the output sprocket wheel 12 can consequently be moved in accordance with the arrow 14. Since the swingarm axle 16 is arranged in relative proximity to a shaft 18 of the drive sprocket wheel 11 the chain 13, upon a movement of the swingarm 15 corresponding to the arrow 17, is moved along largely parallel to the swingarm 15.

Figure 2:
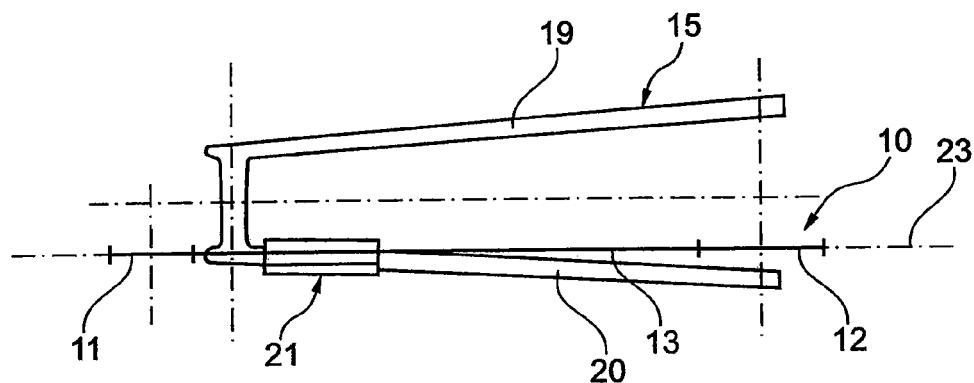
FIG. 2 shows a schematic representation of the chain drive from FIG. 1 in a top view.

As can be seen by viewing FIGS. 1 and 2 together, the swingarm 15 is formed of two box profiles 19 and 20 which between them accommodate a rear wheel of a motorcycle, which is not shown in more detail here, together with the output sprocket wheel 12. Furthermore, the box profile 20 is substantially arranged within the chain 13, wherein more preferably in the region of the swingarm axle 16 the box profile 20 is brought close to the chain 13 because of the regularly smaller size of the drive sprocket wheel 11. In the region of the swingarm axle 16 an application device 21 is mounted to the box profile 20, through which the chain 13 runs. The application device 21 thus comes to bear against a load side 22 of the chain 13 independently of a movement of the swingarm 15. Furthermore, the application device 21 is formed so that a rail device not shown in any detail here is positioned in accordance with a plane 23 of the chain drive 10. The load side 22 of the chain 13 is tensioned substantially straight relative to a slack side 24 of the chain 13 except for load changes, so that the chain 13 can be reliably contacted by the application device 21.

Figure 3:
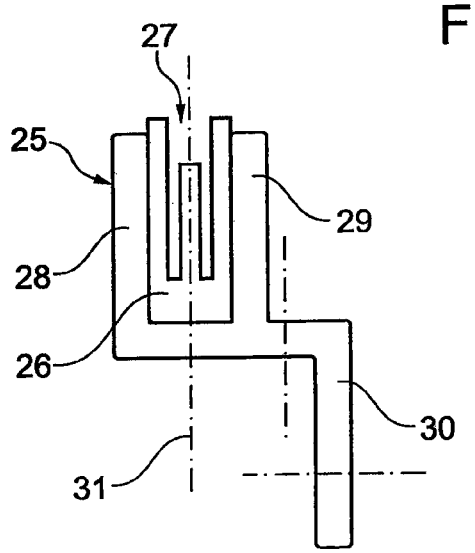
FIG. 3 shows a sectional view of an application device along a line III-III from FIG. 4.
Figure 4:
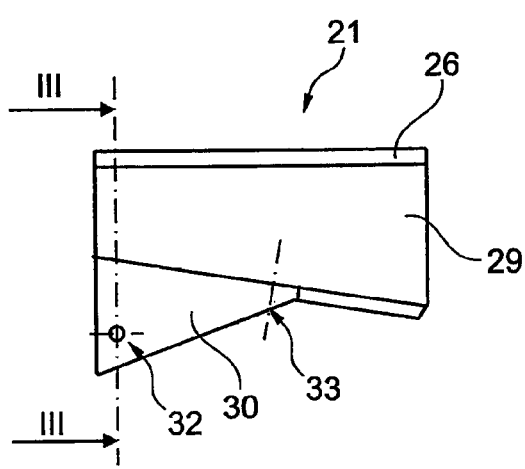
FIG. 4 shows a front view of an application device.

FIGS. 3 and 4 show the application device 21 from FIGS. 1 and 2 in a detailed representation. The application device 21 is substantially formed of a holding device 25 and a rail device 26. The rail device 26 in this exemplary embodiment consists of a consumable solid lubricant, preferentially a graphite material, and forms a holding region 27 for accommodating and guiding the chain 13. The holding device 25 is formed of a light-metal material and accommodates the rail device 26 between two legs 28 and 29. Furthermore, the holding device 25 comprises a leg 30 which is designed so that the rail device 26 can be positioned relative to the chain 35 with an axis of symmetry 31 in accordance with the plane 23 of the chain drive 10.

For fastening the holding device 25 to the box profile 20, through-bores 32 and 33 are provided in the leg 30, which make possible a screw connection of the holding device 25 with the box profile 20 which is not shown in more detail here.

Figure 5:
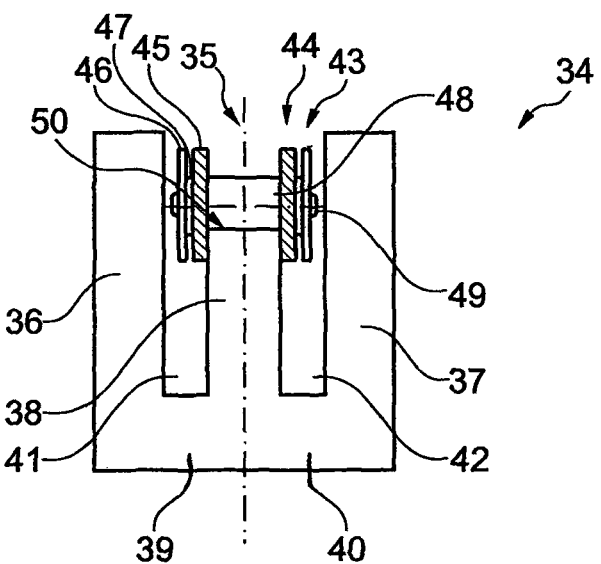
FIG. 5 shows a lateral view of a first embodiment of a rail device with a chain.

FIG. 5 shows a rail device 34 in a lateral view together with a chain 35 in a sectional view. The rail device 34 is formed in one piece and comprises two external guide elements 36 and 37 as well as a guide element 38, which are interconnected via connecting sections 39 and 40. The guide element 38, with regard to its height, is comparatively lower than the outer guide elements 36 and 37 and the connecting sections 39 and 40 are formed so that between the guide element 38 and the outer guide element 36 and between the guide element 38 and the outer guide element 37 slots 41 and 42 respectively are formed, which follow a holding region 43 for the chain 35. Furthermore, the outer guide elements 36 and 37 serve for guiding the chain 35 in the holding region 43. The chain 35 is formed of a multiplicity of chain links 44 connected with one another, each of which is formed of a pair of inner link plates 45, outer link plates 46 and O-rings 47 as well as a bush 48 and a pin 49. More preferably the bush 48 and the inner link plates 45 roll off with sprocket wheels of a chain drive which is not shown here, so that these components of the chain 35 require lubrication. The guide element 38 thus forms a contact region 50 which is orientated alongside the rail device 34, and upon passage of the chain 35 through the rail device 34, guarantees application of solid lubricant through abrasive removal of said lubricant from the guide element 38. When the inner link plates 45 and the outer link plates 46 come to bear against the connecting sections 39 and 40 the guide element 38 is used up.

Figure 6:
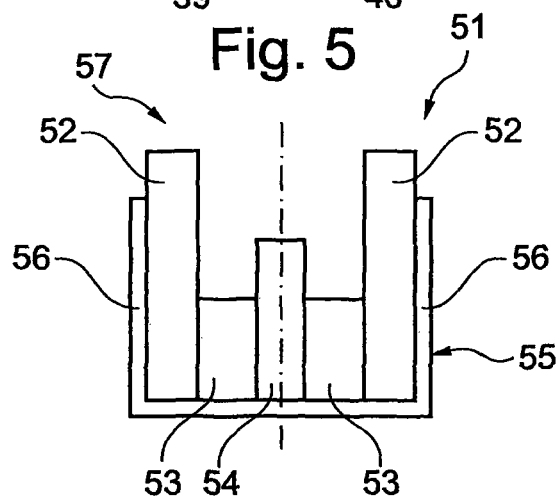
FIG. 6 shows a lateral view of a second embodiment of a rail device.

FIG. 6 shows a second embodiment of a rail device 51 wherein the rail device 51 is formed in multiple parts and is formed of correspondingly formed outer guide elements 52, connecting sections 53, a guide element 54 and a U-profile 55. The U-profile 55 accommodates the outer guide elements 52, the connecting sections 53 and the guide element 54 between legs 56 of the U-profile 55 in the manner of a stack arrangement 57 fixing these relatively to one another. Once the guide element 54 has been used up it can be replaced with a new guide element 54 without having to replace the rail device 51 completely.

Figure 7:
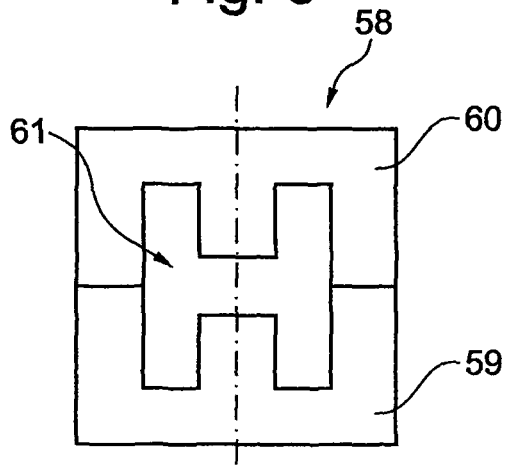
FIG. 7 shows a lateral view of a third embodiment of a rail device.

A third embodiment of a rail device 58 is shown in FIG. 7, wherein the rail device 58 comprises a lower part 59, which serves for lubricating a chain that is not shown here, and an upper part 60 formed as covering element. The lower part 59 is formed in the manner of the rail device shown in FIG. 5 and covered or connected with the upper part 60, which in turn is formed in the manner of the lower part 59, so that a chain can be accommodated in a holding region 61 formed between the lower part 59 and the upper part 60.

Figure 8:
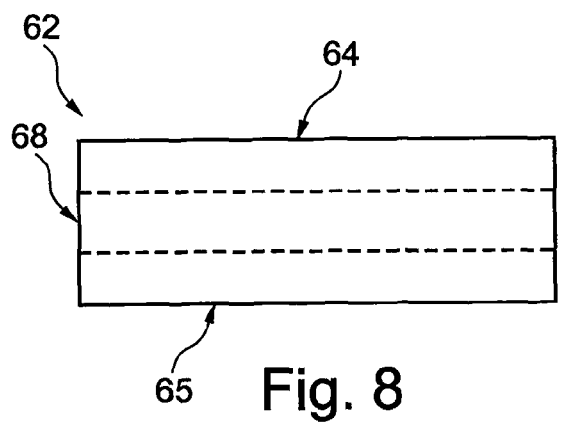
FIG. 8 shows a front view of a fourth embodiment of a rail device.
Figure 9:
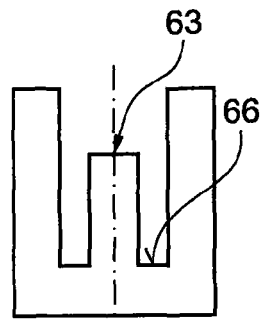
FIG. 9 shows a lateral view of the fourth embodiment of the rail device.

FIGS. 8 and 9 show a rail device 62 which is substantially formed in the shape of a rectangle 68. A contact region 63 runs in longitudinal direction of the rail device 62 substantially parallel to the outer sides 64 and 65 as well as connecting surfaces 66 of the rail device 62.

Figure 10:
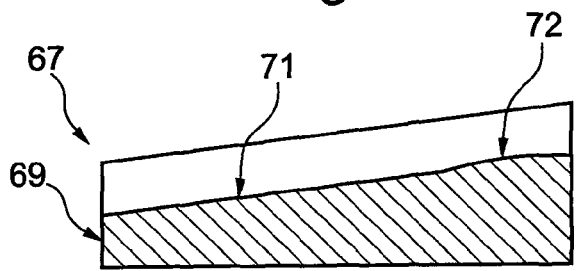
FIG. 10 shows a sectional view along a line X-X from FIG. 11 of a fifth embodiment of a rail device.
Figure 11:
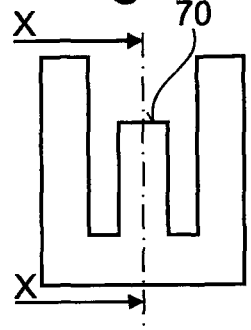
FIG. 11 shows a lateral view of the fifth embodiment of the rail device.

The rail device 67 shown in FIGS. 10 and 11 is formed in the shape of a truncated wedge 69. A contact surface 70 is divided into two contact sub-regions 71 and 72, wherein the contact sub-region 71 is formed flat in longitudinal direction of the rail device 67 and the contact sub-region 72 following the contact sub-region 71 is convex in shape. More preferably the formation of two contact sub-regions 71 and 72 with a contact surface orientation differing from each other serves to influence a running characteristic of a chain and can thus positively influence lubricating and guiding characteristics of the rail device 67.

Figure 12:
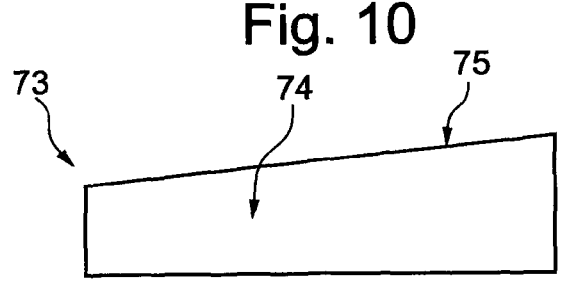
FIG. 12 shows a front view of a sixth embodiment of a rail device.
Figure 13:
FIG. 13 shows a lateral view of the sixth embodiment of the rail device.

A rail device 73 in a simple embodiment is shown by FIGS. 12 and 13. Here, the rail device 73 is designed as a guide element 74 in the shape of a simple plate. A chain which is not shown here merely runs over a contact region 75 of the guide element 74.

Figure 14:
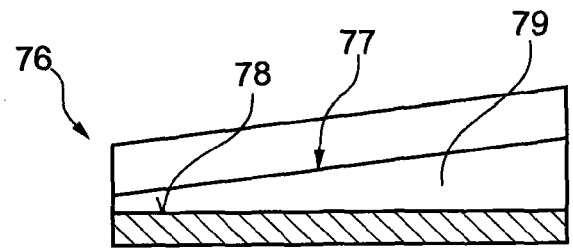
FIG. 14 shows a lateral view along a line XIV-XIV from FIG. 15 of a seventh embodiment of a rail device.
Figure 15:
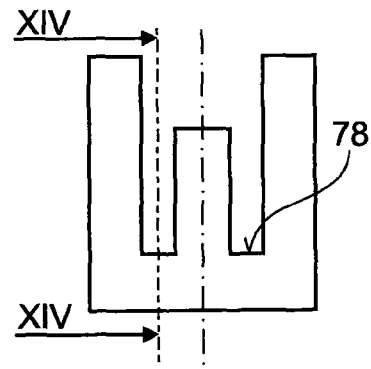
FIG. 15 shows a lateral view of the eighth embodiment of the rail device.
Figure 16:
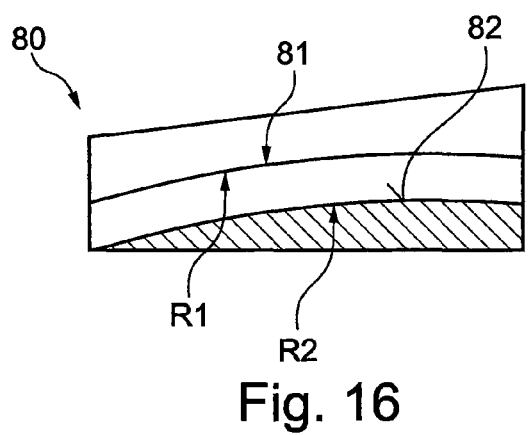
FIG. 16 shows a lateral view along a line XVI-XVI from FIG. 17 of an eighth embodiment of a rail device.
Figure 17:
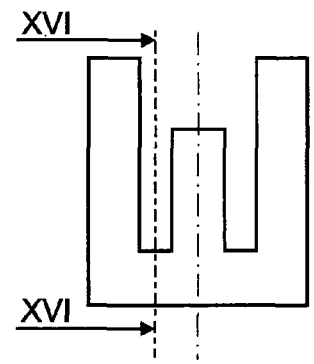
FIG. 17 shows a lateral view of the eighth embodiment of the rail device.

FIGS. 14 and 15 shows an embodiment of a rail device 76 which is designed in the manner of the rail device shown in FIGS. 10 and 11, however in contrast with this, comprises a flat contact region 77 which is inclined at an acute angle relatively to a connecting surface 78. A configuration of the contact region 77 which is different in height to that of the connecting surface 78 takes into account especially expected different wearing of a guide element 79 along a longitudinal extension of the guide element 79.

In contrast with the rail device shown in FIGS. 14 and 15, FIGS. 16 and 17 show a rail device 80 wherein a contact region 81 and connecting surfaces 82 each are formed in different radii R1 and R2 relative to a longitudinal extension of the rail device 80.

Figure 18:
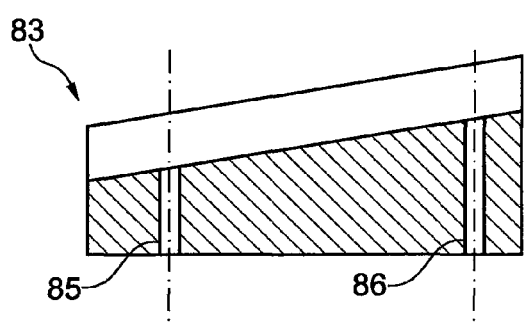
FIG. 18 shows a sectional view along a line XVII-XVII from FIG. 19 of a ninth embodiment of a rail device.
Figure 19:
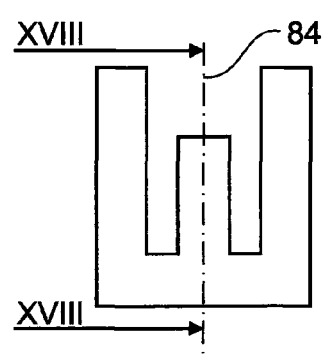
FIG. 19 shows a lateral view of the ninth embodiment of the rail device.

FIGS. 18 and 19 show a rail device 83 which can be varied in its position relative to a chain which is not shown here. The rail device 83 comprises threaded bores 85 and 86 arranged in a symmetry plane 84, in which screws that are not shown in more detail can be inserted. The screws can more preferably be utilised for adjusting the rail device 83 or, upon wear of the rail device 83, for adjusting the latter relative to a chain.

Figure 20:
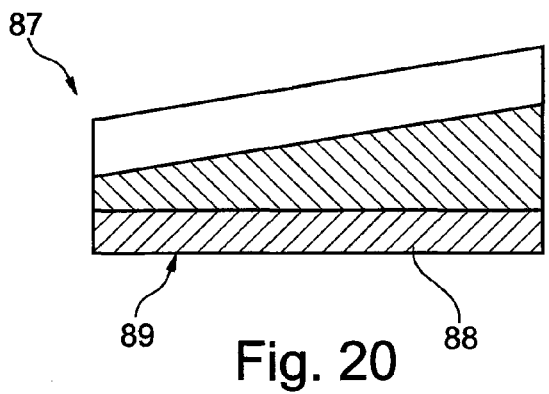
FIG. 20 shows a sectional view along a line XX-XX from FIG. 21 of a tenth embodiment of a rail device.
Figure 21:
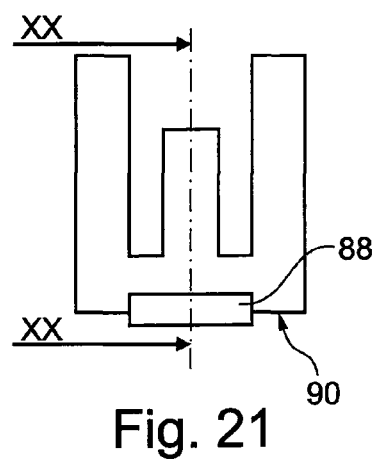
FIG. 21 shows a lateral view of the tenth embodiment of the rail device.

A rail device 87 shown in FIGS. 20 and 21 comprises an adjusting device designed as a wedge 88. By shifting the wedge 88 in longitudinal direction of the rail device 87 within a rectangular slot formed in an outer side 90 of the rail device 87, height variation of the rail device 87 relative to a chain that is not shown here is made possible.

Preferred embodiments and examples of the invention have been described in considerable detail. Many modifications and variations to the preferred embodiment described will be apparent to a person of ordinary skill in the art. It should be understood, therefore, that the methods and apparatuses described above are only illustrative and do not limit the scope of the invention, and that various modifications could be made by those skilled in the art that would fall within the scope of the invention.

The invention claimed is:

1. An application device for lubricating a motorcycle chain drive including a sprocket wheel, a drive sprocket, a chain, and a swing arm, the application device comprising:
   a rail device coupled to the swing arm such that the rail device does not rotate relative to the swing arm, the rail device including a contact region that extends in a longitudinal direction of the rail device, does not rotate, and contacts the chain, the contact region including a flat sub-region and a convex sub-region, each contact sub-region aligned and extending in the longitudinal direction,
   wherein at least the contact region is formed of a consumable solid lubricant that is applied to the chain, and
   wherein a contact region length extends in a direction parallel with the longitudinal direction of the rail device, the contact region length longer than a contact region width defined transverse to the longitudinal direction of the rail device.

2. The application device according to claim 1, in which the rail device includes at least one guide element.

3. The application device according to claim 2, in which the guide element is designed plate-shaped.

4. The application device according to claim 2, in which the guide element forms the contact region and can be contacted with bushes of the chain.

5. The application device according to claim 2, in which the guide element forms an incline in the longitudinal direction.

6. The application device according to claim 2, in which the rail device comprises outer guide elements that can accommodate outer link plates of the chain between the outer guide elements.

7. The application device according to claim 6, in which the rail device includes a connecting section for connecting the outer guide elements.

8. The application device according to claim 2, in which the rail device is designed in multiple parts.

9. The application device according to claim 8, in which the rail device is designed as a stack arrangement of guide elements with connecting sections.

10. The application device according to claim 2, in which the rail device includes a further guide element which forms a covering element in such a manner that the chain can be enclosed on all sides by the rail device transversely to a movement direction.

11. The application device according to claim 1, in which the rail device is designed monolithically.

12. The application device according to claim 1, in which the rail device forms at least one truncated wedge form.

13. The application device according to claim 1, in which the rail device can be brought to bear against a load side of the chain.

14. The application device according to claim 1, in which the rail device can be brought to bear against a slack side of the chain.

15. The application device according to claim 1, further comprising a holding device for positioning and holding the rail device relative to the chain.

16. The application device according to claim 15, in which the holding device is designed so that it can be connected with the swing arm.

17. The application device according to claim 15, in which the rail device can be varied in its height relative to the holding device by an adjusting device.

18. The application device according to claim 15, in which the holding device is designed so that at least the consumable solid lubricant can be replaced.

19. The application device according to claim 1, in which the application device is arranged as a swing arm guard.

20. The application device according to claim 1, in which the application device is arranged as a chain guide.

21. The application device according to claim 1, in which the solid lubricant is produced on a graphite basis.

22. The application device according to claim 21, in which the solid lubricant at least partially includes an admixture of at least one of polytetrafluoroethylene, copper, lead, antimony, and molybdenum sulfide.

23. The application device according to claim 1, in which the solid lubricant contains a wear-diminishing additive.

24. The application device according to claim 1, in which the solid lubricant contains a corrosion-inhibiting additive.

25. The application device according to claim 1, in which the solid lubricant comprises a layer structure with layers that are different in their composition.

26. The application device according to claim 1, in which the chain defines a direction of travel and the longitudinal direction of the contact region is parallel to the direction of travel.

27. A method for lubricating a motorcycle chain drive with an application device, the motorcycle chain drive including a sprocket wheel, a drive sprocket, a chain, and a swing arm, the application device including a rail device coupled to the swing arm such that the rail device does not rotate relative to the swing arm, the rail device including a contact region that extends in a longitudinal direction of the rail device, does not rotate, and contacts the chain, the contact region including a flat sub-region and a convex sub-region, each contact sub-region aligned and extending in the longitudinal direction, wherein at least the contact region is formed of a consumable solid lubricant that is applied to the chain, and wherein a contact region length extends in a direction parallel with the longitudinal direction of the rail device, the contact region length longer than a contact region width defined transverse to the longitudinal direction of the rail device, the method comprising:

engaging the contact region with the chain.

* * * * *